May 29, 1928.  1,671,311
M. PFARR
HOEING MACHINE
Filed Oct. 20, 1926
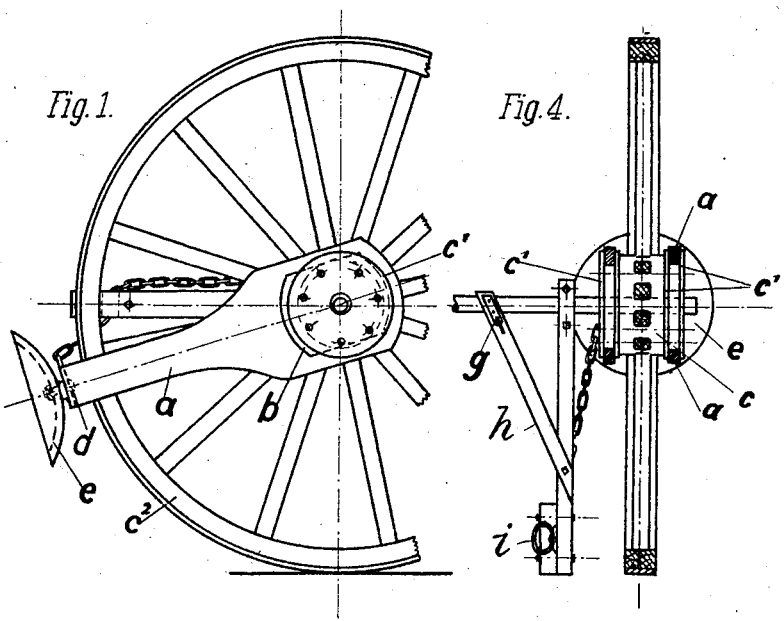
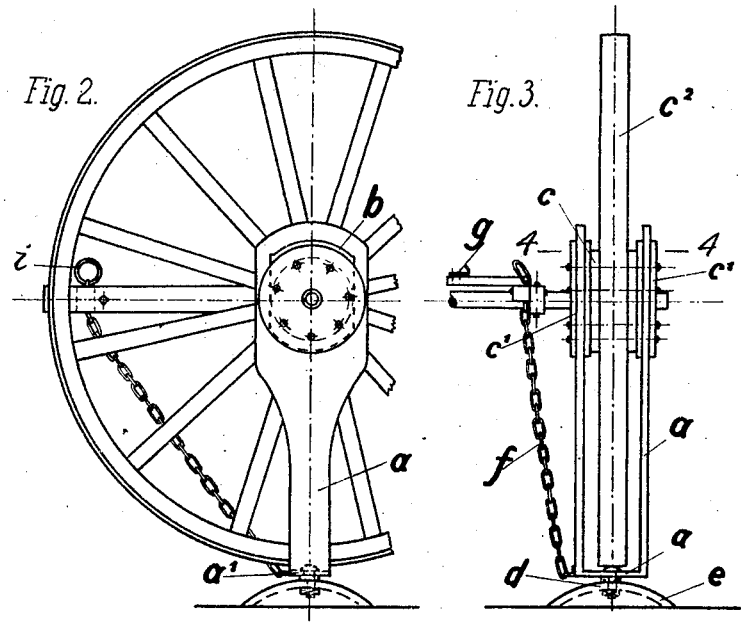
Inventor:
Max Pfarr.

Patented May 29, 1928.

1,671,311

UNITED STATES PATENT OFFICE.

MAX PFARR, OF LEHNITZ-ON-THE-NORDBAHN, GERMANY.

HOEING MACHINE.

Application filed October 20, 1926, Serial No. 142,968, and in Germany November 23, 1925.

In order to enable two-wheeled agricultural machines, such as hoeing machines or the like, to turn horizontally about one of the wheels without digging the latter into the ground and destroying plants that happen to be underneath it, it is usual to run the wheel on to a shoe which is connected by a chain to the machine frame and which is swivelled to a supporting plate. As the device is loose, its positioning relative to the wheel, involves a certain amount of trouble and waste of time the avoidance of which is the object of the present invention. The latter consists in the provison for each wheel, of a U-shaped frame which embraces the wheel and which is able to swing about the wheel axis as well as to be adjusted radially relative to the same, the frame being provided at its free end with a swivelled shield and adapted to support the wheel on said shield when the machine is to be turned. The supporting position of the frame is determined, just as that of the known shoe, by a chain connected to the vehicle frame.

With this arrangement the application of the wheel support involves no other trouble than that of releasing the frame so as to allow it to drop from its inoperative position into its supporting position.

It is to be observed that it is known in connection with road vehicles to employ a similarly arranged frame carrying a wheel-supporting member fitted with rollers to which rotation is imparted from the wheel for moving the vehicle at an angle to the wheel plane, and to such an arrangement I make no claim.

Fig. 1 of the accompanying drawings represents a side view of the device in its idle position, Fig. 2, a view of the same in supporting position, Fig. 3, a view at right angles to Fig. 2, and Fig. 4, a horizontal section on the line 4—4 of Fig. 3.

The wheels $c^2$ of a hoeing machine are each embraced by a U-frame $a$ which is preferably mounted by means of apertures $b$ between flanges $c^1$ on the wheel hub $c$, the arrangement being such that the frame can swing about the hub and also slide on the same in a radial direction.

Swivelly connected to the free end of the frame is a shield $e$ which is so arranged that it can be interposed by means of the frame between the ground and the wheel and serve as a supporting platform for the wheel, as shown in Figs. 2 and 3. The shield is swivelled to the frame by means of a strong bolt $d$ which serves as a pivot about which the wheel can swing when the machine is turned round for starting a fresh row.

Normally the shield is held behind the wheel in an idle position clear of the ground, as shown in Fig. 1. For holding the shield in this position, a chain $f$ is preferably used which is connected at one end to the free end of the frame $a$ and passed through a guide aperture in a horizontal bracket $h$ in the machine so that it can be pulled through said aperture for raising the shield from the ground and then connected to a hook $g$ for holding the frame in an inclinded position. A large ring $i$ at the end of the chain is used for connecting it to the hook $g$. This ring is incapable of passing through the guide aperture in the bracket and thus determines the vertical position of the frame as shown in Fig. 2.

During the operation of the machine, the frame is held in the position shown in Fig. 1. When the machine is to be turned round, the chain is released from the hook so that the frame can drop and apply the shield $e$ to the ground. As the wheel turns backwards, the shield slips in between it and the ground, the frame being at the same time displaced on the hub so that the wheel comes to rest on the cross member of the frame, the length of the chain being chosen so that the frame can not swing forwards beyond the vertical position. The wheel and frame can then swing in a horizontal plane about the pivot $d$, the shield $e$ serving as a stationary supporting platform.

The shield is preferably domed as shown so that if it should happen to come to rest over a plant, the latter, even if pressed down, will be able to right itself and recover.

I claim:

1. In a hoeing machine, a U-frame embracing each wheel, said frame being able to swing about the wheel axis and to be radially adjusted relative to the same, a shield connected swivelly to the free end of the frame so that it can be interposed by means of the frame between the ground and the wheel and serve as a supporting platform on which the wheel and frame can turn about a vertical axis, and a chain connecting the frame to the vericle so that it can be used for holding the frame either in idle or in supporting position, substantially as and for the purpose set forth.

2. The structure claimed in 1 wherein the shield is domed.

MAX PFARR.